(12) United States Patent
Aoki

(10) Patent No.: US 11,430,473 B2
(45) Date of Patent: Aug. 30, 2022

(54) SUSPENSION ASSEMBLY WITH ETCHED REGION AND DISK DRIVE WITH THE SAME

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Kenichiro Aoki, Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/376,065

(22) Filed: Jul. 14, 2021

(65) Prior Publication Data

US 2022/0157337 A1    May 19, 2022

(30) Foreign Application Priority Data

Nov. 16, 2020 (JP) .............................. JP2020-190263

(51) Int. Cl.
  *G11B 5/48*    (2006.01)

(52) U.S. Cl.
  CPC ............ *G11B 5/4833* (2013.01); *G11B 5/486* (2013.01); *G11B 5/4826* (2013.01); *G11B 5/4853* (2013.01)

(58) Field of Classification Search
  CPC ... G11B 5/4833; G11B 5/4826; G11B 5/4853; G11B 5/486
  See application file for complete search history.

(56) References Cited

U.S. PATENT DOCUMENTS

| 5,936,806 | A | * | 8/1999 | Pan .................... | G11B 5/4826 |
| | | | | | 360/234.6 |
| 8,854,826 | B2 | | 10/2014 | Ohsawa | |
| 8,913,348 | B2 | | 12/2014 | Higuchi et al. | |
| 9,117,446 | B2 | | 8/2015 | Bao et al. | |
| 9,117,466 | B2 | | 8/2015 | Takikawa et al. | |
| 2005/0037139 | A1 | * | 2/2005 | Fujisaki ............... | G11B 5/4833 |
| | | | | | 427/127 |
| 2006/0087768 | A1 | * | 4/2006 | Erpelding .............. | H05K 3/303 |
| | | | | | 360/234.5 |
| 2009/0310260 | A1 | * | 12/2009 | Miyazawa .............. | H05K 3/44 |
| 2013/0021699 | A1 | * | 1/2013 | Ohsawa ................. | H05K 1/056 |
| 2015/0187377 | A1 | * | 7/2015 | Fujimura ............. | G11B 5/4826 |
| | | | | | 360/244.1 |
| 2019/0198047 | A1 | * | 6/2019 | Ee ........................ | G11B 5/483 |

FOREIGN PATENT DOCUMENTS

JP    H07-153215 A    6/1995

* cited by examiner

*Primary Examiner* — Brian E Miller
(74) *Attorney, Agent, or Firm* — Kim & Stewart LLP

(57) ABSTRACT

According to one embodiment, a suspension assembly includes a support plate, a wiring member on the support plate, and a magnetic head mounted on the wiring member. The magnetic head includes a head slider and connection pads provided at an outflow end of the head slider and electrically connected to the wiring lines. The wiring member includes a head installation region in which the magnetic head is mounted, and an etched region which is at least partly located in the head installation region and is opposed to an end portion of the head slider at the inflow end thereof to form a gap between the end portion and the etched region.

10 Claims, 7 Drawing Sheets

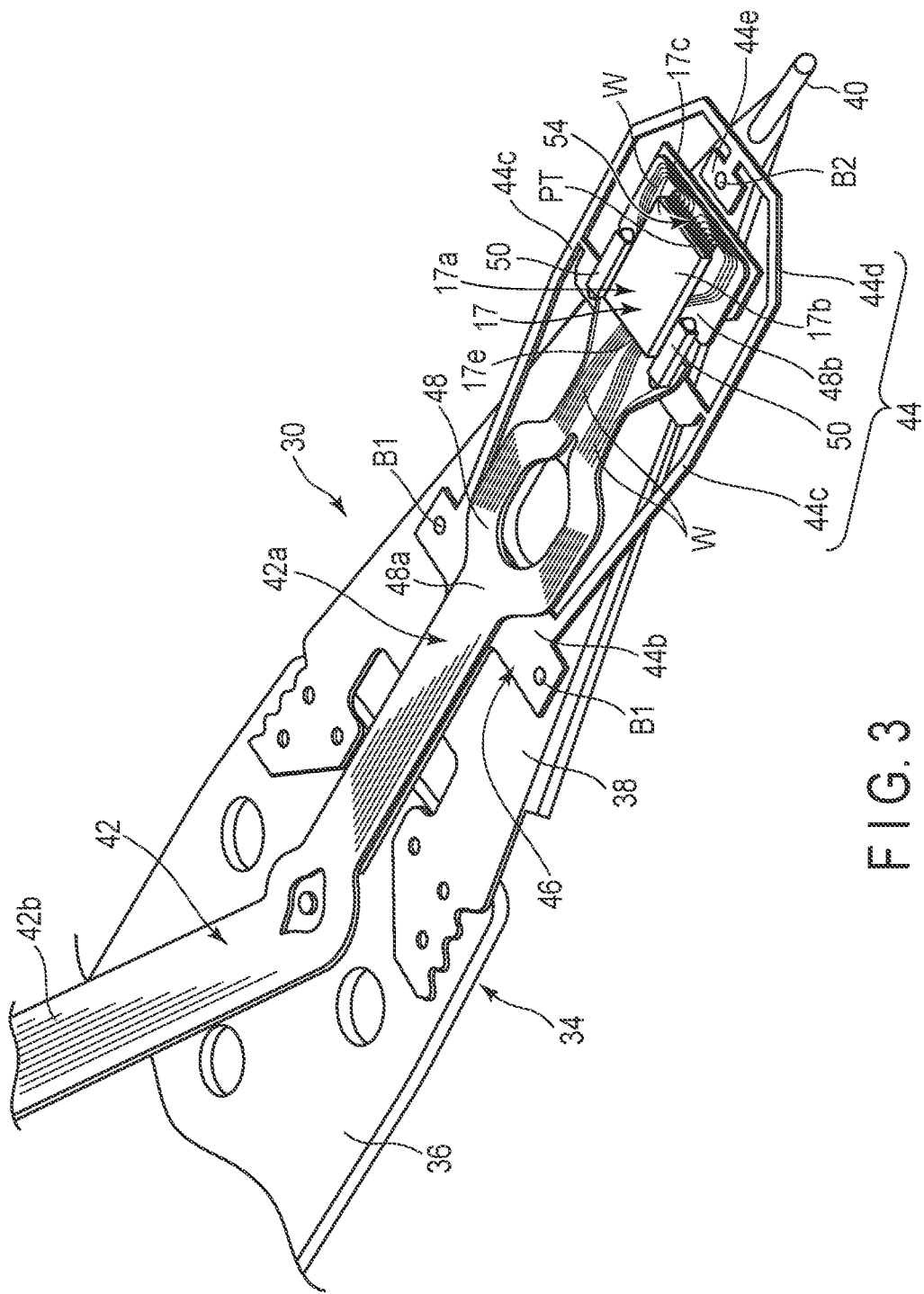
F I G. 3

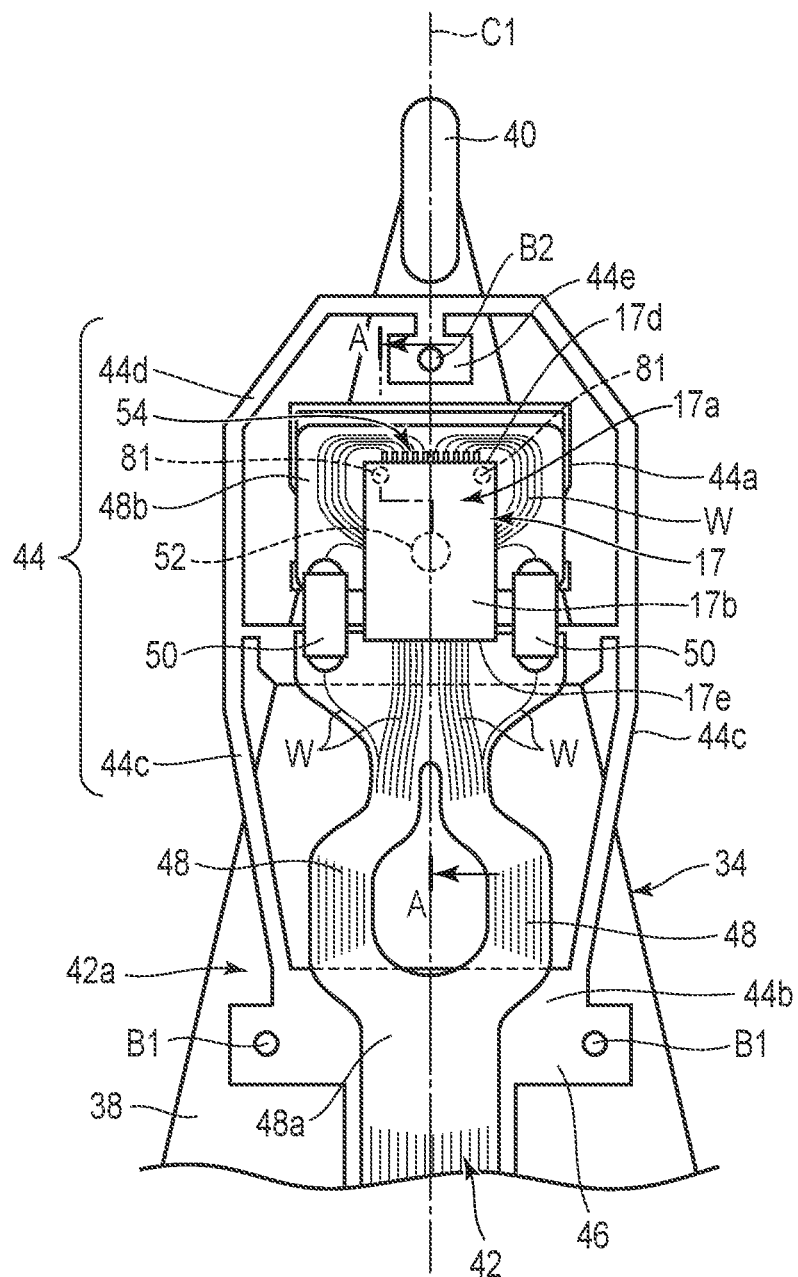
F I G. 5

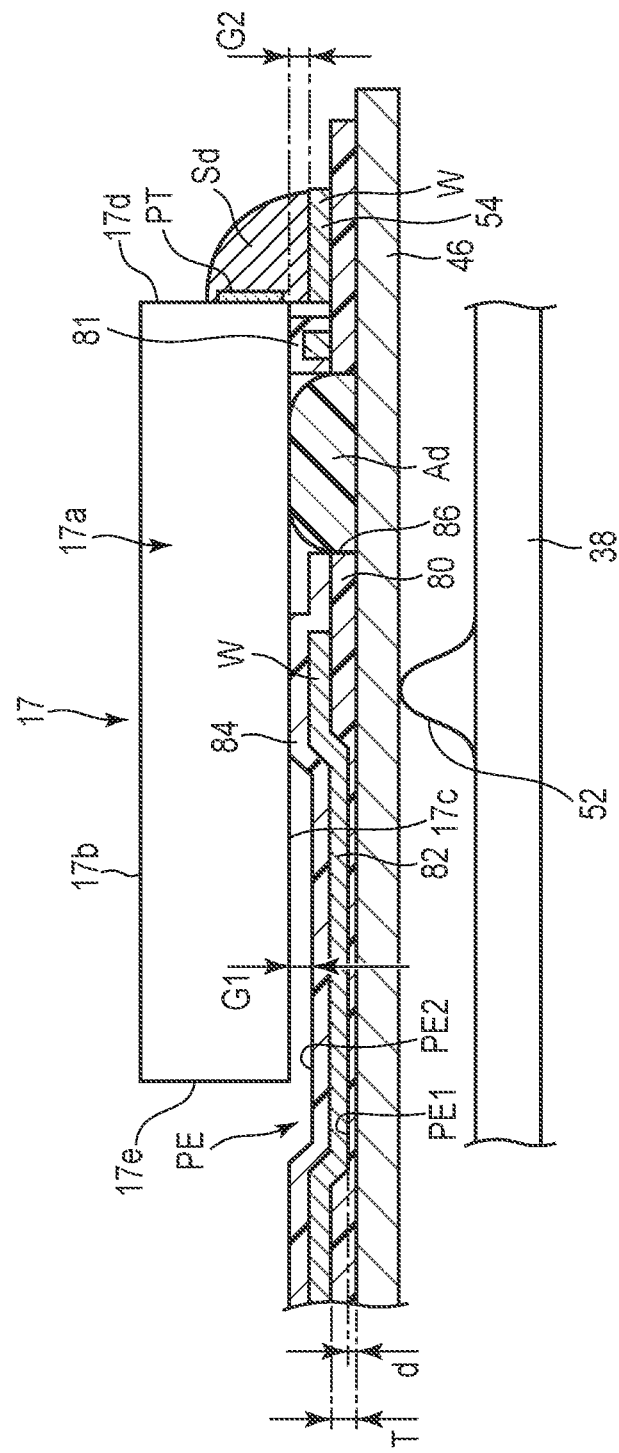
F I G. 7

SUSPENSION ASSEMBLY WITH ETCHED REGION AND DISK DRIVE WITH THE SAME

CROSS-REFERENCE TO RELATED APPLICATIONS

This application is based upon and claims the benefit of priority from Japanese Patent Application No. 2020-190263, filed Nov. 16, 2020, the entire contents of which are incorporated herein by reference.

FIELD

Embodiments described herein relate generally to a suspension assembly used for a disk drive, and a disk drive comprising the suspension assembly.

BACKGROUND

As a disk drive, for example, a hard disk drive (HDD) comprises a plurality of magnetic disks arranged rotatably in a housing, a plurality of magnetic heads which read and write information from and to the magnetic disks, and a head actuator which supports the magnetic heads movably with respect to the magnetic disks.

The head actuator comprises a rotatably supported actuator block, and a plurality of suspension assemblies (referred to also as gimbal assemblies) which extend from the actuator block and support the magnetic heads at distal end portions thereof. The suspension assembly comprises a base plate one end of which is fixed to an arm, a load beam extending from the base plate, and a flexure (wiring member) provided on the load beam and the base plate. The flexure has a displaceable gimbal portion, and the magnetic head is mounted on the gimbal portion.

Normally, the magnetic head is fixed to the distal end portion of the suspension or the gimbal portion of the flexure by an adhesive. The magnetic head is electrically connected to wiring lines of the flexure by solder, a conductive adhesive or the like.

BRIEF DESCRIPTION OF THE DRAWINGS

FIG. 3 is a perspective view showing one head suspension assembly of the actuator assembly.

FIG. 5 is a plan view of the head suspension assembly.

FIG. 7 is a cross-sectional view of the gimbal portion along line A-A of FIG. 5.

DETAILED DESCRIPTION

Figure 1:
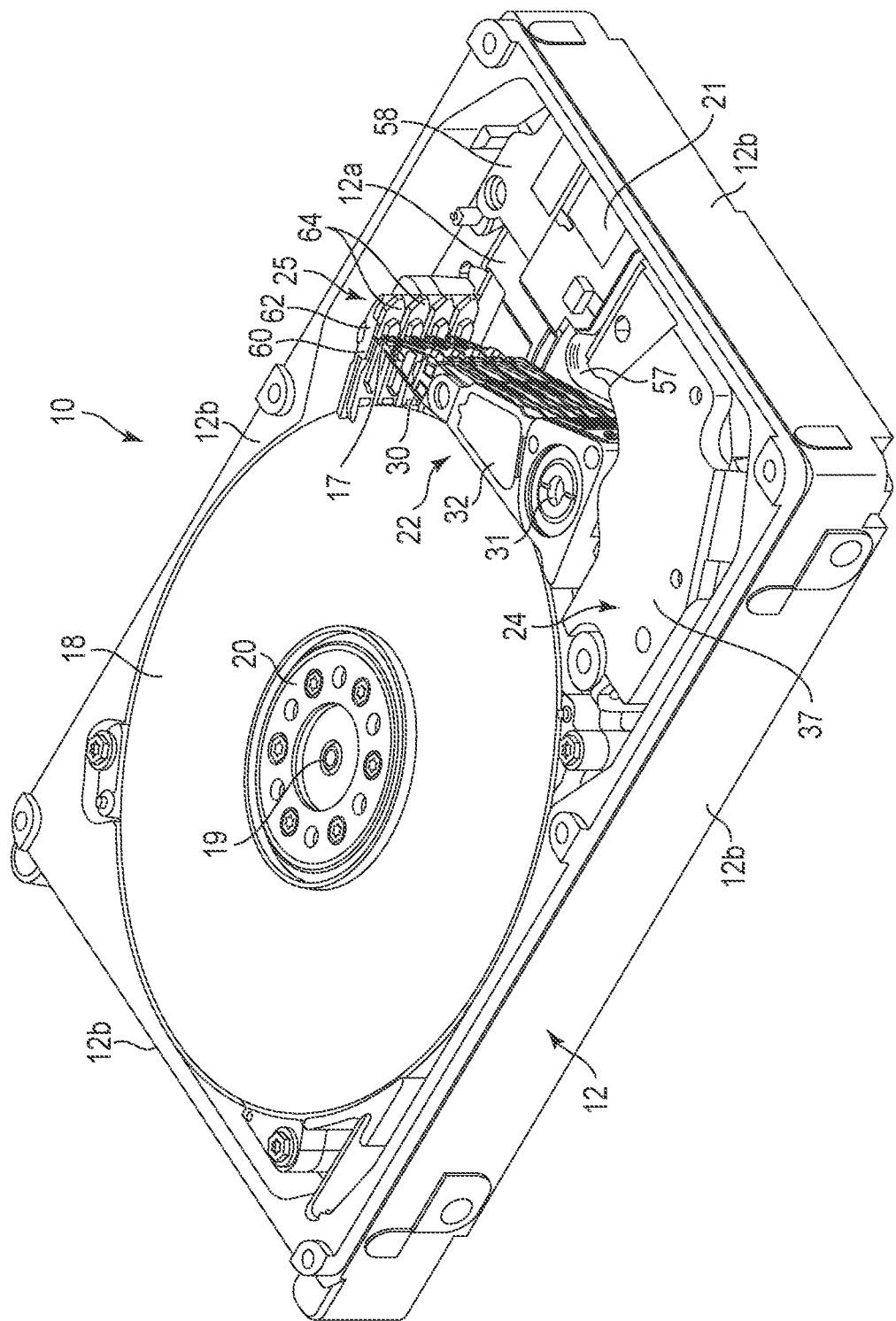
FIG. 1 is a perspective view showing a hard disk drive (HDD) according to an embodiment.

Various embodiments will be described hereinafter with reference to the accompanying drawings.

In general, according to one embodiment, a suspension assembly comprises: a support plate having a distal end portion and a proximal end portion; a wiring member on the support plate, comprising a metal plate, a first insulating layer on the metal plate, a conductive layer on the first insulating layer and forming wiring lines and connection pads, and a second insulating layer on the conductive layer and the first insulating layer; and a magnetic head mounted on the wiring member, and comprising a head slider having an outflow end and an inflow end. The outflow end is located closer to the distal end portion of the support plate than the inflow end and the inflow end is located closer to the proximal end portion than the outflow end. The magnetic head further comprises a plurality of connection pads provided at the outflow end and electrically connected to the wiring lines. The wiring member includes a head installation region in which the magnetic head is mounted, and an etched region which is at least partly located in the head installation region and is opposed to an end portion of the head slider at the inflow end thereof to form a gap between the end portion and the etched region.

The disclosure is merely an example, and proper changes in keeping with the spirit of the invention, which are easily conceivable by a person with ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by the same reference numbers, and detailed description thereof is omitted unless necessary.

Embodiment

As a disk drive, a hard disk drive (HDD) according to an embodiment will be described in detail.

FIG. 1 is a perspective view of the HDD according to the embodiment shown removing a top cover.

As shown in the drawing, the HDD comprises a rectangular housing 10. The housing 10 has a base 12 formed in an open-topped rectangular box shape, and an unillustrated top cover. The base 12 has a rectangular bottom wall 12a, and a sidewall 12b standing along the peripheral edge of the bottom wall 12a, and is formed integrally using aluminum, for example. The top cover is formed in a rectangular plate shape using stainless steel, and is screwed to the sidewall 12b by a plurality of screws.

A plurality of magnetic disks 18 as a disk-shaped recording medium and a spindle motor 19 supporting and rotating the magnetic disks 18 are provided in the housing 10. The spindle motor 19 is arranged on the bottom wall 12a. The magnetic disks 18 each have a substrate formed in a disk shape having a diameter of 95 mm (3.5 inches), for example, and made of a nonmagnetic material such as glass or aluminum, for example, and magnetic recording layers formed on the upper surface (first surface) and the lower surface (second surface) of the substrate. The magnetic disks 18 are engaged coaxially with an unillustrated hub of the spindle motor 19, and are then cramped by a cramp spring 20. Accordingly, the magnetic disks 18 are supported parallel to the bottom wall 12a of the base 12. The magnetic disks 18 are rotated at a predetermined rotational speed by the spindle motor 19.

In the present embodiment, for example, four magnetic disks 18 are arranged in the housing 10. However, the number of magnetic disks 18 is not limited to this but may be less than or equal to three or greater than or equal to five.

A plurality of magnetic heads 17 which record and reproduce information on and from the magnetic disks 18 and an actuator assembly 22 which supports the magnetic heads 17 movably with respect to the magnetic disks 18 are provided in the housing 10. In addition, a voice coil motor (VCM) 24 which rotates and positions the actuator assembly 22, a ramp loading mechanism 25 which holds the magnetic heads 17 at an unloading position away from the magnetic disks 18 when the magnetic heads 17 are moved to the outermost circumferences of the magnetic disks 18, and a board unit (FPC unit) 21 mounted with electronic components such as a conversion connector are provided in the housing 10.

An unillustrated printed circuit board is screwed to the outer surface of the bottom wall 12a of the base 12. The printed circuit board constitutes a controller which controls the operation of the spindle motor 19 and also controls the operations of the VCM 24 and the magnetic heads 17 via the board unit 21.

Figure 2:
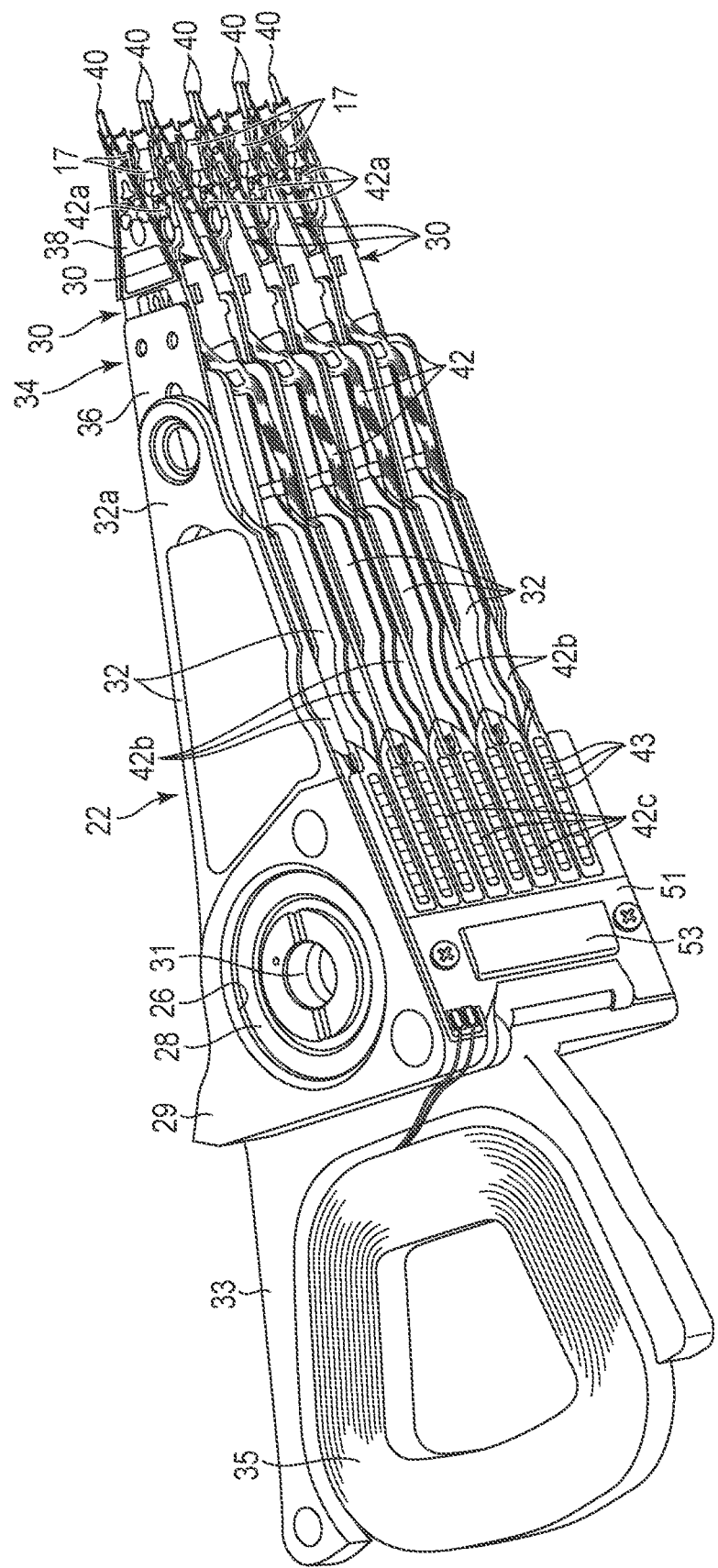
FIG. 2 is a perspective view showing an actuator assembly of the HDD.

FIG. 2 is a perspective view showing the actuator assembly 22. As shown in the drawing, the actuator assembly 22 comprises an actuator block 29 having a through hole 26, a bearing unit (unit bearing) 28 provided in the through hole 26, a plurality of, for example, five arms 32 extending from the actuator block 29, suspension assemblies 30 mounted on the arms 32, and the magnetic heads 17 supported on the suspension assemblies 30. The actuator block 29 is supported rotatably about a support shaft (pivot) 31 standing on the bottom wall 12a, by the bearing unit 28.

In the present embodiment, the actuator block 29 and the five arms 32 are formed integrally using aluminum or the like, and constitute what is called an E block. The arms 32 are formed in a long thin plate shape, for example, and extend in a direction orthogonal to the support shaft 31 from the actuator block 29. The five arms 32 are provided parallel to each other at intervals.

The actuator assembly 22 has a support frame 33 extending from the actuator block 29 in the opposite direction to the arms 32. A voice coil 35 constituting a part of the VCM 24 is supported on the support frame 33. As shown in FIG. 1, the voice coil 35 is located between a pair of yokes 37 one of which is fixed to the base 12, and constitutes the VCM 24 together with the yokes 37 and a magnet fixed to one of the yokes.

As shown in FIG. 2, the actuator assembly 22 comprises eight suspension assemblies 30 supporting the magnetic heads 17. The suspension assemblies 30 are mounted on distal end portions 32a of the arms 32. The suspension assemblies 30 include an up-head suspension assembly supporting a magnetic head 17 such that the magnetic head 17 faces up, and a down-head suspension assembly supporting a magnetic head 17 such that the magnetic head 17 faces down. The up-head suspension assembly and the down-head suspension assembly are constituted by vertically turning over the suspension assemblies having the same structure.

In the present embodiment, in FIG. 2, the uppermost arm 32 is mounted with the down-head suspension assembly 30, and the lowermost arm 32 is mounted with the up-head suspension assembly 30. The middle three arms 32 each are mounted with the up-head suspension assembly 30 and the down-head suspension assembly 30.

Next, an example of the suspension assembly 30 will be described in detail.

Figure 4:
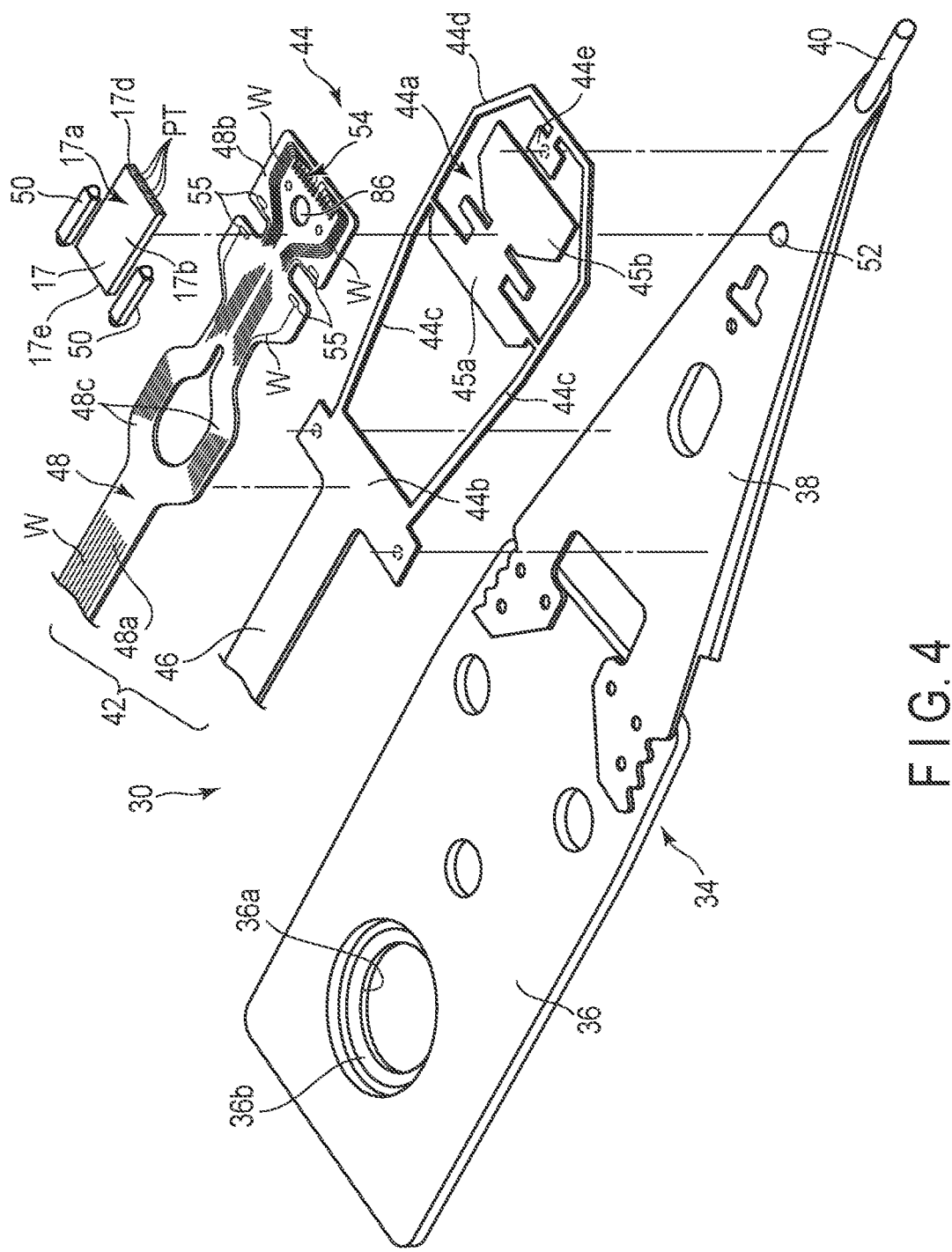
FIG. 4 is an exploded perspective view of the head suspension assembly.

FIG. 3 is a perspective view showing the suspension assembly, FIG. 4 is an exploded perspective view of the suspension assembly, and FIG. 5 is a plan view of the suspension assembly.

As shown in FIGS. 3 and 4, each suspension assembly 30 has a suspension 34 extending from the arm 32, and the magnetic head 17 is mounted on the distal end portion of the suspension 34. The magnetic head 17 and the suspension assembly 30 supporting the magnetic head 17 are referred to collectively as a head suspension assembly.

The suspension 34 functioning as a support plate has a rectangular base plate 36 made of a metal plate having a thickness of several hundreds of microns, and a load beam 38 formed in a long thin plate spring shape and made of a metal plate having a thickness of several tens of microns. The load beam 38 is arranged such that a proximal end portion thereof overlaps the distal end portion of the base plate 36, and is fixed to the base plate 36 by welding a plurality of places thereof. The distal end portion of the load beam 38 constitutes the distal end portion of the support plate, and the proximal end portion of the load beam 38 and the base plate 36 constitute the proximal end portion of the support plate. The width of the proximal end portion of the load beam 38 is substantially equal to the width of the base plate 36. A rod-shaped tub 40 is protrudingly provided at the distal end portion of the load beam 38.

The base plate 36 has a circular opening 36a and an annular protruding portion 36b located around the opening 36a at a proximal end portion thereof. The protruding portion 36b is fitted in and swaged to an unillustrated circular swaging hole formed in a swaging seat surface of the arm 32 so that the base plate 36 is fastened to the distal end portion 32a of the arm 32. The proximal end of the base plate 36 may be fixed to the distal end portion 32a of the arm 32 by laser welding, spot welding or bonding.

The suspension assembly 30 has a long thin strip-shaped flexure (wiring member) 42 for transmitting a recording signal, reproduction signal and a piezoelectric element driving signal, and a pair of piezoelectric elements (for example, PZT elements) 50 mounted on the flexure 42. As shown in FIGS. 2 and 3, the flexure 42 has a distal portion 42a arranged on the load beam 38 and the base plate 36, a proximal portion 42b extending outward from a side edge of the base plate 36 and then extending along a side edge of the arm 32 to the actuator block 29, and a connection end portion 42c extending from the extension end of the proximal portion 42b. The connection end portion 42a has a plurality of connection pads (electrode pads) 43 arranged side by side. These connection pads 43 are electrically connected to connection terminals of a wiring board 51 installed in the actuator block 29.

As shown in FIGS. 3, 4 and 5, the distal end portion of the flexure 42 is located on the distal end portion of the load beam 38, and constitutes a gimbal portion 44 functioning as an elastic support portion. The magnetic head 17 is mounted on and fixed to the gimbal portion 44, and is supported on the load beam 38 via the gimbal portion 44. The pair of piezoelectric elements 50 as a driving element are mounted on the gimbal portion 44, and are arranged on both sides of the magnetic head 17.

The flexure 42 has a thin metal plate (metal plate) 46 made of stainless steel or the like and serving as a base, and a strip-shaped laminated member (flexible printed circuit (FPC)) 48 bonded or fixed to the thin metal plate 46, and forms a long thin laminate. The laminated member (FPC) 48 has a base insulating layer (first insulating layer) mostly fixed to the thin metal plate 46, a conductive layer (wiring pattern) formed on the base insulating layer and constituting a plurality of signal lines, a plurality of driving lines and a plurality connection pads, and a cover insulating layer (second insulating layer) covering the conductive layer and stacked on the base insulating layer. For example, copper foil is used as the conductive layer, and the signal lines, the driving lines and the connection pads are formed by patterning this copper foil.

In the distal portion 42a of the flexure 42, the thin metal plate 46 is bonded to the surfaces of the load beam 38 and the base plate 36 or is spot-welded at a plurality of welding points. In one example, the thin metal plate 46 has two welding points (first welding portions) B1 welded to the proximal end portion of the load beam 38, and one welding point (second welding portion) B2 welded to the distal end portion of the load beam 38. That is, the thin metal plate 46 is welded to the load beam 38 in at least two places, that is, the welding points B1 located close to the leading end (outflow end) of the magnetic head 17 and the welding point B2 located close to the trailing end (inflow end) of the magnetic head 17.

In the gimbal portion 44, the thin metal plate 46 integrally has a substantially rectangular tongue portion (support portion) 44a located close to a distal end thereof, a substantially rectangular proximal end portion (first end portion) 44b located close to a proximal end thereof across a space from the tongue portion 44a, a pair of elastically deformable outriggers (link portions) 44c linking the proximal end portion 44a and the tongue portion 44a and displaceably supporting the tongue portion 44a, a link frame 44d extending from one outrigger 44c to the other outrigger 44c through close to the distal end of the tongue portion 44a, and a substantially rectangular fixed pad portion (second end portion) 44e extending from the link frame 44d and opposed to a distal end portion of the tongue portion 44a. The fixed pad portion 44e is located between the link frame 44a and the tongue portion 44a.

The proximal end portion 44b is bonded to the surface of the load beam 38, and is spot-welded to the load beam 38 at the welding points B1. The fixed pad portion 44e is spot-welded to the distal end portion of the load beam 38 at the welding point B2. The welding point B2 is located on a central axis C1 of the suspension 34.

As shown in FIG. 4, the tongue portion 44a is formed in such a size and a shape that the magnetic head 17 can be mounted thereon, and is formed in, for example, a substantially rectangular shape. The tongue portion 44a is arranged such that a central axis thereof in the width direction matches the central axis C1 of the suspension 34. The tongue portion 44a has a rear end portion 45a located close to the proximal end portion 44b, and a front end portion 45b located close to the distal end of the suspension 34. Both side portions in the width direction of the rear end portion 45a are linked respectively to the outriggers 44c. In the tongue portion 44a, a central portion between rear end portion 45a and the front end portion 45b is narrowed as compared with the other portions.

The tongue portion 44a, substantially at the center thereof, is in contact with a dimple (convex portion) 52 which is provided on the distal end portion of the load beam 38 and protrudes therefrom. As the pair of outriggers 44c and the link frame 44d elastically deform, the tongue portion 44a can be displaced in various directions using the dimple 52 as a fulcrum. Accordingly, the tongue portion 44a and the magnetic head 17 mounted on the tongue portion 44a are displaced in the roll direction or the pitch direction flexibly following the surface fluctuation of the magnetic disk 18, and maintain a minute gap between the surface of the magnetic disk 18 and the magnetic head 17.

As shown in FIGS. 3, 4 and 5, in the gimbal portion 44, the laminated member 48 of the flexure 42 is arranged on the metal plate 46, and extends along the central axis C1 from the proximal end portion 44b to above the tongue portion 44a through the space. That is, the laminated member 48 has a proximal end portion 48a bonded to the proximal end portion 44b, a distal end portion 48b bonded to the tongue portion 44a, and a pair of strip-shaped bridge portions 48c extending bifurcated from the proximal end portion 48a to the distal end portion 48b. The distal end portion 48b constitutes a head installation region in which the magnetic head 17 is mounted.

In the distal end portion 48b, a plurality of connection pads (electrode pads) 54 are arranged in the width direction. In the distal end portion 48b, a plurality of connection pads (electrode pads) 55 for connecting the piezoelectric elements 50 are also provided. The laminated member 48 has a plurality of signal lines W extending from the connection pads 54 toward the proximal end portion 48a through both side edge portions of the distal end portion 48b, and a plurality of driving lines W extending from the connection pads 55 toward the proximal end portion 48a. The signal lines W and the driving lines W extend over substantially the entire length of the laminated member 48, and are connected to the connection pads 43 of the connection end portion 42c. As shown in FIG. 4, a through hole 86 is provided in a central portion of the distal end portion 48b, particularly, in a region in which the wiring lines W are not present. This through hole 86 is filled with an adhesive which will be described later.

The magnetic head 17 comprises a substantially rectangular head slider 17a, and an unillustrated recording element (write head) and an unillustrated read element (read head) provided in the head slider 17a. The head slider 17a includes an upper surface (ABS) 17b opposed to the surface of the magnetic disk 18, a back surface 17c on the opposite side, an outflow end 17d located close to the distal end of the load beam 38, and an inflow end 17e located close to the proximal end portion of the load beam 38. The magnetic head 17 comprises a plurality of connection pads PT provided at the outflow end 17d of the head slider 17a. These connection pads PT are electrically connected to the recording element, the read element, a heater and the like of the magnetic head 17.

While the back surface 17c of the head slider 17a is opposed to the distal end portion 48b, the magnetic head 17 is mounted overlapping the distal end portion 48b on the tongue portion 44a, and is fixed to the distal end portion 48b by an adhesive. The magnetic head 17 is arranged such that a central axis thereof in the longitudinal direction matches the central axis C1 of the suspension 34, and substantially the center of the magnetic head 17 is located on the dimple 52. The connection pads PT of the magnetic head 17 are electrically connected to the connection pads 54 of the distal end portion 48b by solder or a conductive adhesive Sd (see FIG. 7) such as a silver paste. Accordingly, the magnetic head 17 is connected to the signal lines W of the laminated member 48 via the connection pads 54.

The pair of piezoelectric elements 50 each are, for example, a thin film piezoelectric element (PZT element) having a rectangular plate shape. The piezoelectric elements 50 each are not limited to a thin film type piezoelectric element (thickness of about 10 μm) but may be a bulk type or bulk laminated type piezoelectric element (thickness of greater than or equal to 40 μm). In addition, the piezoelectric elements 50 each are not limited to a PZT element but may be another piezoelectric element. Furthermore, the driving element is not limited to a piezoelectric element but may be another driving element which can expand and contract by applying current.

The piezoelectric elements 50 are arranged such that the longitudinal direction (expansion/contraction direction) becomes parallel to the central axis C1 of the suspension 34. The two piezoelectric elements 50 are arranged on both sides in the width direction of the magnetic head 17, and are arranged parallel to each other. Both end portions in the longitudinal direction of each piezoelectric element 50 are mounted on and electrically connected to the connection pads 55 of the distal end portion 48b. Accordingly, the piezoelectric elements 50 are connected to the driving lines W of the laminated member 48 via the connection pads 55.

Next, the mounting structure of the magnetic head 17 will be described in detail.

Figure 6:
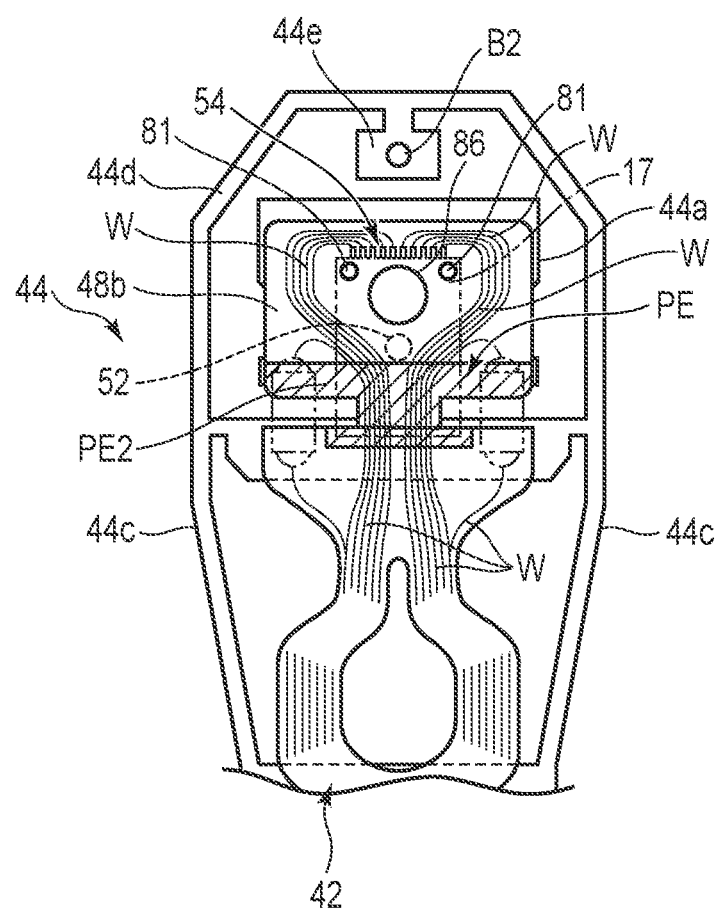
FIG. 6 is a plan view of a gimbal portion of the head suspension assembly shown omitting a magnetic head.

FIG. 6 is a plan view of the gimbal portion 44 shown omitting the cover insulating layer, and FIG. 7 is a cross-sectional view of the gimbal portion along line A-A of FIG. 5.

As shown in FIG. 6, the distal end portion 48b of the laminated member (FPC) 48 is bonded to the tongue portion 44a, and constitutes the head installation region in which the magnetic head 17 is mounted. In the head installation region, the through hole 86 is provided in a region in which the wiring lines W are not present. In addition, the distal end portion 48b has an etched region (concave portion) PE which is at least partly located in the head installation region and is opposed to an end portion close to the inflow end of the head slider 17a. The magnetic head 17 is fixed to the head installation region by an adhesive Ad filling the through hole 86.

As shown in FIGS. 6 and 7, the distal end portion 48b of the laminated member 48 has a base insulating layer (first insulating layer) 80 fixed to the tongue portion 44a formed of the metal plate 46, a conductive layer (wiring pattern) 82 formed on the base insulating layer 80 and constituting the signal lines W, the driving lines W and the connection pads, and a cover insulating layer (second insulating layer) 84 covering the conductive layer 82 and stacked on the base insulating layer 80. For example, copper foil is used as the conductive layer, and the signal lines W, the driving lines W, and the connection pads 54 and 55 are formed by patterning this copper foil. The through hole 86 penetrates the base insulating layer 80 and the cover insulating layer 84.

The magnetic head 17 is fixed to the tongue portion 44a by the adhesive Ad filling the through hole 86. The adhesive Ad filling the through hole 86 is in contact with the back surface 17c of the head slider 17a, the surface of the metal plate 46, and the inner peripheral surface of the through hole 86. Therefore, the contact area of the adhesive Ad increases, and the adhesive strength improves. The central portion of the back surface 17c of the head slider 17a is in contact with the cover insulating layer 84 and is opposed to the dimple 52.

The etched region PE of the distal end portion 48b is provided closer to the inflow end 17e of the magnetic head 17 than the dimple 52. The etched region PE is opposed to the end portion close to the inflow end 17e of the head slider 17a with a gap G1. According to the present embodiment, the etched region PE has a width greater than the width of the head slider 17a, and extends beyond the inflow end 17e of the head slider 17a toward the proximal end portion 48a.

According to the present embodiment, in the etched region PE, a concave portion (first concave portion) PE1 is formed by partially etching a part of the base insulating layer 80. A depth d of the concave portion PE1 is about 30 to 70% of a thickness T of the base insulating layer 80. In one example, the thickness T of the base insulating layer 80 is 8 μm, and the depth d of the concave portion PE1 is 3 to 5 μm. The signal lines W are at least partly provided on the bottom surface of the concave portion PE1. In the cover insulating layer 84 stacked on the base insulating layer 80, a region overlapping the concave portion PE1 and the signal lines W is recessed according to the depth of the concave portion PE1, and forms a concave portion (second concave portion) PE2 shaped corresponding to the concave portion PE1. In one example, the depth of the concave portion PE2 of the cover insulating layer 84 is 3 to 5 μm.

Accordingly, the end portion of the head slider 17a located closer to the inflow end 17e of the magnetic head 17 than the dimple 52 is opposed to the bottom surface of the concave portion PE2 with the gap G1 without contacting the cover insulating layer 84. The gap G1 corresponds to the depth of the concave portion PE2.

The head slider 17a is mounted directly on the cover insulating layer 84. Therefore, a gap G2 between the connection pads PT provided at the outflow end 17d of the head slider 17a and the connection pads 54 close to the signal lines W is about the same as the gap G1, and is 3 to 5 μm in one example. The connection pads PT and the connection pads 54 are electrically connected by the conductive adhesive Sd.

The distal end portion 48b of the laminated member 48 has a plurality of, for example, two support posts 81 provided between the through hole 86 and the connection pads 54. The support posts 81 each are formed in, for example, a columnar shape by the conductive layer 82 and the cover insulating layer 84. The two support posts 81 are provided at positions opposed to two corner portions close to the outflow end 17d of the head slider 17a. The corner portions of the back surface 17c of the head slider 17a are in contact with the support posts 81. That is, the two corner portions close to the outflow end 17d of the head slider 17a are mounted on the support ports 81 and are supported by the support posts 81.

On the other hand, as shown in FIGS. 1 and 2, the board unit 21 of the HDD integrally has a substantially rectangular base portion 58, a long thin strip-shaped relay portion 57 extending from the base portion 58, and a wiring board 51 provided continuously with the distal end of the relay portion 57. The base portion 58, the relay portion 57 and the wiring board 51 are formed of a flexible printed circuit (FPC). The base portion 58 is arranged on the bottom wall 12a of the base 12, and the wiring board 51 is mounted on an installation surface of the actuator block 29.

Electronic components such as an unillustrated conversion connector and a plurality of unillustrated capacitors are mounted on the base portion 58. A large number of unillustrated connection pads are provided in the wiring board 51. The connection end portions 42c of the flexures 42 of the suspension assemblies 30 described above are connected to the connection pads of the wiring board 51 by solder, for example. In addition, a head IC (head amplifier) 53 is mounted on the wiring board 51, and the head IC 53 is connected to connection pads and the base portion 58 via a plurality of unillustrated wiring lines. Accordingly, the eight magnetic heads 17 of the actuator assembly 22 are electrically connected to the base portion 58 via the wiring lines of the flexures 42, the connection end portions 42c, the wiring board 51, the head IC 53 and the relay portion 57.

As shown in FIG. 1, the ramp loading mechanism 25 has a ramp 60 installed in the base 12, and the tub 40 engageable with the ramp 60. As described above, the tub 40 is provided at the distal end of the load beam 38 of the suspension assembly 30. The ramp 60 is fixed to the bottom wall 12a of the base 12, and is located close to a peripheral edge portion of the magnetic disk 18. The ramp 60 comprises a block-shaped ramp body 62. In one side portion of the ramp body 62, eight guide surfaces (guide portions) 64 which support and guide the tubs 40 provided in the eight suspension assemblies 30 are formed.

During the operation of the HDD, the actuator assembly 22 is turned as the support shaft 31 is turned by the VCM 24, the magnetic heads 17 are moved to a desired seek position while being opposed to the surfaces of the magnetic disks 18. As shown in FIG. 1, during the non-operation of the HDD, the actuator assembly 22 is turned to the unloading position at which the magnetic heads 17 are located outside the outermost peripheries of the magnetic disks 18, and the tubs 40 of the suspension assemblies 30 run on the guide surfaces 64 of the corresponding ramps 60. Accordingly, the magnetic heads 17 are held at the unloading position away from the magnetic disks 18 by the damps 60.

According to the HDD and the suspension assembly configured as described above, the etched region PE having the concave portions PE1 and PE2 is provided in the head installation region of the laminated member 48 in which the magnetic head 17 is mounted, and the gap G1 is thereby formed between the end portion close to the inflow end 17e of the magnetic head 17 and the laminated member 48. Therefore, during the rotational movement of the magnetic head 17 about the dimple 52 along with the driving of the piezoelectric elements 50, the contact between the inflow end 17e of the magnetic head 17 and the laminated member 48 can be prevented, and the magnetic head 17 can be smoothly moved. According to the above-described configuration, there is no need to further provide the second cover insulating layer for forming a gap, and the magnetic head 17 can be superposed directly on the cover insulating layer 84. Therefore, the gap between the connection pads PT of the magnetic head 17 and the connection pads 54 of the laminated member 48 can be reduced by the thickness of the second cover insulating layer, and these connection pads PT and 54 can be connected more easily and more reliably by the conductive adhesive Sd. That is, the connecting process of the connection pads can be performed excellently.

According to the present embodiment, the laminated member 48 has the support posts 81, and the end portion close to the inflow end 17a of the magnetic head 17 is supported by the support posts 81. Therefore, during the rotational movement of the magnetic head 17, the displacement of the outflow end 17d and the connection pads PT of the magnetic head 17 can be regulated, and a load acting on the junction of the connection pads PT and the connection pads 54 can be reduced. Accordingly, a reliable connection state can be maintained, and reliability can be improved.

As described above, according to the present embodiment, a suspension assembly capable of safely connecting a magnetic head to a wiring member, and a disk drive comprising the suspension assembly can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the etched region PE of the laminated member 48 is not limited to a rectangular shape, but another shape may be arbitrarily selected. The etched region PE has a concave portion formed by partially etching the base insulating layer 80. However, the etched region PE is not limited to this but may have a concave portion formed by partially etching not only the base insulating layer but also one or two or more of the metal plate, the conductive layer and the cover insulating layer.

The materials, shapes, sizes and the like of the elements constituting the suspension assembly are not limited to those of the above-described embodiment but may be variously modified as needed. In the disk drive, the number of magnetic disks is not limited to four but may be less than or equal to three or greater than or equal to six, and the number of suspension assemblies and the number of magnetic heads may be increased or reduced according to the number of magnetic disks installed.

What is claimed is:

1. A suspension assembly comprising:
a support plate having a distal end portion and a proximal end portion;
a wiring member on the support plate, comprising a metal plate, a first insulating layer on the metal plate, a conductive layer on the first insulating layer and forming wiring lines and connection pads, and a second insulating layer on the conductive layer and the first insulating layer; and
a magnetic head mounted on the wiring member, and comprising a head slider having an outflow end and an inflow end, wherein the outflow end is located closer to the distal end portion of the support plate than the inflow end and the inflow end is located closer to the proximal end portion of the support plate than the outflow end, the magnetic head further comprising a plurality of connection pads provided at the outflow end and electrically connected to the wiring lines, wherein
the wiring member includes a head installation region in which the magnetic head is mounted, and an etched region which is at least partly located in the head installation region and is opposed to an end portion of the head slider at the inflow end thereof to form a gap between the end portion and the etched region.

2. The suspension assembly of claim 1, wherein
the wiring member comprises a tongue portion supported displaceably with respect to the support plate and constituting the head installation region, and the support plate includes a convex portion contacting the head slider via the tongue portion and the wiring member, and
the etched region is located closer to the inflow end than the convex portion.

3. The suspension assembly of claim 2, wherein the wiring member includes a through hole penetrating the second insulating layer and the first insulating layer and located between the outflow end and the convex portion, and the magnetic head is bonded to the metal plate by an adhesive filling the through hole.

4. The suspension assembly of claim 1, wherein the etched region includes a first concave portion formed in the first insulating layer, and a second concave portion formed in the second insulating layer and overlapping the first concave portion.

5. The suspension assembly of claim 1, wherein the wiring member comprises a support post provided in the head installation region and supporting another end portion of the head slider at the outflow end thereof.

6. A disk drive comprising:
   a disk-shaped recording medium; and
   a suspension assembly which comprises:
   a support plate having a distal end portion and a proximal end portion;
   a wiring member on the support plate, comprising a metal plate, a first insulating layer on the metal plate, a conductive layer on the first insulating layer and forming wiring lines and connection pads, and a second insulating layer on the conductive layer and the first insulating layer; and
   a magnetic head mounted on the wiring member, and comprising a head slider having an outflow end and an inflow end, wherein the outflow end is located closer to the distal end portion of the support plate than the inflow end and the inflow end is located closer to the proximal end portion of the support plate than the outflow end, the magnetic head further comprising a plurality of connection pads provided at the outflow end and electrically connected to the wiring lines, wherein
   the wiring member includes a head installation region in which the magnetic head is mounted, and an etched region which is at least partly located in the head installation region and is opposed to an end portion of the head slider at the inflow end thereof to form a gap between the end portion and the etched region.

7. The disk drive of claim 6, wherein
   the wiring member comprises a tongue portion supported displaceably with respect to the support plate and constituting the head installation region, and the support plate includes a convex portion contacting the head slider via the tongue portion and the wiring member, and
   the etched region is located closer to the inflow end than the convex portion.

8. The disk drive of claim 7, wherein the wiring member includes a through hole penetrating the second insulating layer and the first insulating layer and located between the outflow end and the convex portion, and the magnetic head is bonded to the metal plate by an adhesive filling the through hole.

9. The disk drive of claim 6, wherein the etched region includes a first concave portion formed in the first insulating layer, and a second concave portion formed in the second insulating layer and overlapping the first concave portion.

10. The disk drive of claim 6, wherein the wiring member comprises a support post provided in the head installation region and supporting another end portion of the head slider at the outflow end thereof.

* * * * *